REFLEX-REFLECTING WALL STRUCTURE

Filed March 23, 1959

INVENTOR
EUGENE L. McKENZIE
MELVIN L. JOHNSON
BY
Carpenter, Abbott, Coulter & Kinney
ATTORNEYS United States Patent Office 3,034,406

Patented May 15, 1962

3,034,406
REFLEX-REFLECTING WALL STRUCTURE

Eugene L. McKenzie, North St. Paul, and Melvin L. Johnson, Roseville, Minn., assignors to Minnesota Mining and Manufacturing Company, St. Paul, Minn., a corporation of Delaware Filed Mar. 23, 1959, Ser. No. 801,405
3 Claims. (Cl. 88—82)

This application is a continuation-in-part of our application, Serial Number 791,165, filed February 4, 1959, now abandoned.

This invention relates to improvements in the art of telecasting, and more particularly, to reflex-reflecting sheet material useful in the art of telecasting.

Many expedients have been suggested to present television viewers with a television picture having vividness of detail throughout without employing expensive stage settings. One such expedient involves employing a master camera in combination with a satellite camera, the master being directed upon a set where action takes place and the satellite being directed upon a miniature set (or photograph or projected moving picture) which supplies the background for the action. Theoretically, such an arrangement offers what appears to be the greatest promise in getting vividness and realism in background areas of a television picture without leaving the studio to achieve the result. It permits slight differences in brightness between, for example, ocean whitecaps, white sand and a white bathing suit to be distinctly apparent to the televiewer, whereas other arrangements for telecasting a picture have tended to cause the whiteness of such objects to blend into a single blur of whiteness. It makes possible scenes of accurate and fine, plainly-visible detail, which could not be done realistically in the studio before (e.g., scenes having a background of a beach, snow, desert, darkened jungle, a street at nighttime, a darkened room, etc.). It permits panning, close-ups, different angles of view, etc. However, certain optical requirements arise because of the camera arrangement necessary to achieve this result; and these optical requirements have heretofore been stumbling blocks to the full success of this improved technique.

It is vital for the master camera trained on the main set where action takes place to pick up a limited band of wave lengths of essentially uniform observed intensity from all areas of the set background not masked by an actor or other object present on the main set. The picture created by this limited band of wave lengths (with blank spaces where an actor or object is present) is converted to electronic signals which are utilized to cause a printing (i.e., telecasting) of the picture picked up by the satellite camera in only those areas representative of the picture created by the limited band of wave lengths from the main set. Areas of the picture picked up by the satellite camera corresponding to areas occupied by an actor or object in the main set are blocked so that they are not telecast. Thus, the televiewer receives a composite picture of the actor or objects from the main set superimposed in the setting picked up by the satellite camera. It is clear that such an arrangement for television photography permits different lighting to be used for different portions of the composite picture received by the viewer; thus enhancing the achievement of detail and realism without incurring great expense.

The success of the technique, however, is highly dependent on the main camera receiving a selected limited band of wave lengths of essentially uniform observed intensity from all areas of the background of the main set (and few or no wave lengths within this limited band from the actors or objects in the main set).

This invention provides a flexible reflex-reflecting sheet material particularly useful for mounting on wall portions of a main set so as to permit such a result as aforedescribed to be accomplished. The flexible sheet material hereof serves not only as a brilliant reflex-reflector of light primarily in a limited range as desired, but also does not suffer from the defects of specularity or glare associated with many prior art reflex-reflecting sheet articles.

The principles and details of this invention will be explained in connection with a drawing, made a part hereof, wherein.

Figure 1:
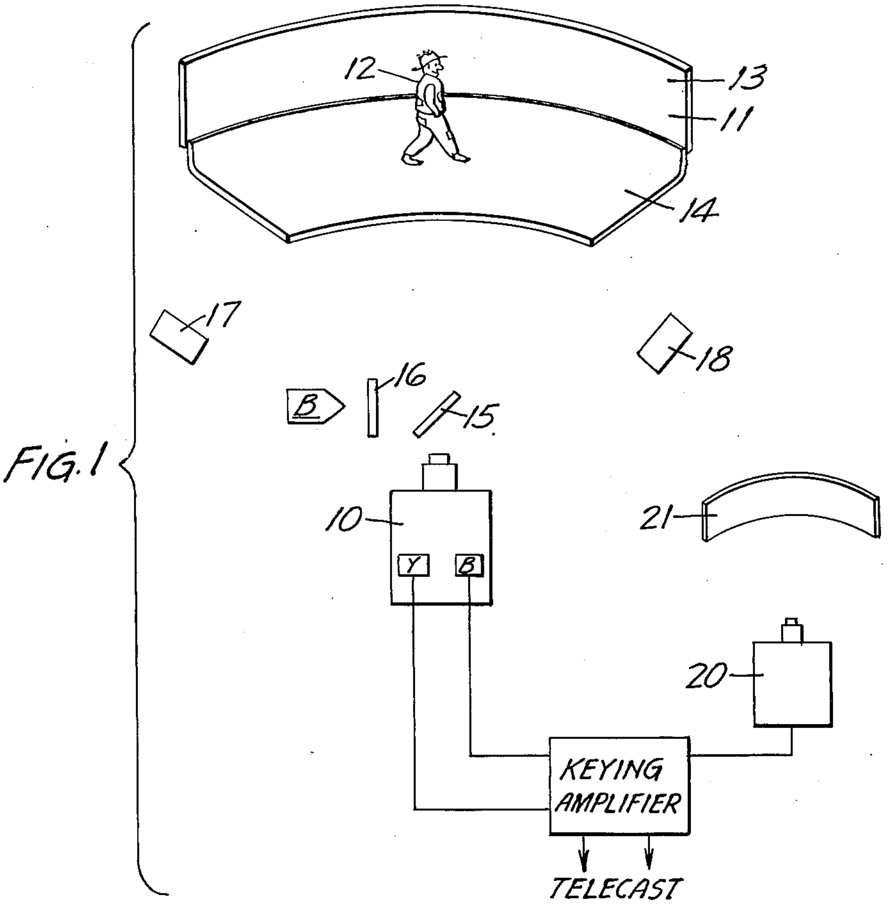
FIGURE 1 is a schematic illustration of the relationship of various elements of telecasting equipment employed to obtain the result here discussed.

The relationship of various elements of apparatus schematically illustrated in FIGURE 1 will first be explained so as to orient the reader.

The master camera 10 is directed upon main set 11 where the main action takes place such as movement by an actor 12. The set 11 exhibits essentially uniform reflex-reflecting intensity to camera 10 throughout its entire area, e.g. throughout wall portions 13 and floor portion 14 thereof.

While camera 10 is operating, a satellite camera 20 serves to pick up a background image from miniature set 21, which may comprise a miniature (or actual size) stage setting or a mere photograph (or a projected picture, or even a series of photographs such as projected from a movie film). Camera 10 and camera 20 are synchronized through servo-mechanisms so that movement of camera 10 is accompanied by a corresponding relative (but smaller) movement by camera 20.

Immediately in front of camera 10 is located a half-silvered mirror 15 at an angle of approximately 45 degrees to the plane of the lens of camera 10. At right angles to camera 10 is a light source B directed upon the half-silvered mirror 15 so that a significant amount of light from light source B is reflected to the stage setting background screen 11. Preferably this light source is of indigo blue light (e.g., 4000 to 5200 angstrom units) having a peak wave length of about 4600 angstrom units. While light source B may include all wave lengths of visible light, it is essential that the reflex-reflecting properties of wall 13 and floor 14 be limited essentially to a narrow range of wave lengths (e.g., indigo blue). If desired, a filter 16 may be juxtaposed between half-silvered mirror 15 and source B. Usually such a filter will be employed where light source B includes a variety of wave lengths of light, the filter serving to limit transmission to a relatively narrow band as desired. Flood lamps 17 and 18 are directed upon the actor or action taking place before the background 11.

In operation, light from source B strikes half-silvered mirror 15 and is reflected toward the set 11, which in turn serves as a brilliant reflex-reflector of essentially uniform intensity, and returns brilliant cones of light from all portions thereof toward the lens of camera 10. A significant amount of this reflex-reflected light passes through half-silvered mirror 15 into camera 10. Simultaneously stage lighting falling upon character 12 (or object) is reflected in a variety of wave lengths and picked up by camera 10, a significant amount passing through half-silvered mirror 15 so as to be available for pick up by the camera 10. The light received by the image orthocon tube of camera 10 is channeled by two cells, Y and B into separate circuits. (The brightness of the character 12 or other object in the stage setting is readily improved or corrected by adjustments well known to the art.) Cell B serves to pick up wave lengths of the relatively limited range returned by the set 11, whereas cell Y picks up remaining wave lengths, e.g., light reflected from character 12 or other object before the screen 11. In other words, cells Y and B respond selectively to the light of the image picked up by the camera, separating the impulse representative of the light into two channels. The signal supplied by cell Y to the keying amplifier for telecasting is telecast essentially as received by the keying amplifier (i.e., the actor or object before screen 11 is telecast directly), whereas the signal supplied by cell B (representative of all areas of background 11 except masked out portions occupied by the actor 12) serves as a doctoring signal causing signals of the image picked up by camera 20 to be telecast only in those areas representative of the reflex-reflected light from screen 11. The result is that the image picked up by satellite camera 20 is telecast in all areas except those in which an actor or object is present before screen 11 and picked up by camera 10. The viewer receives a composite picture of fine detail and delineation which contributes to realism.

In order for this system of telecasting to operate efficiently, it is vital that the image from the background areas of screen 11 be essentially uniform in intensity in all areas and of a limited wave length. If main camera 10 is to pick up action which includes a portion of the floor 14 as part of the background for the action, it is important to employ a reflex-reflecting sheet material on the floor which provides satisfactory brilliance and uniformity of reflex-reflection analogously to that provided by wall portions 13 of the background area. Reflex-reflecting sheet materials useful for floor areas 14 and which provide brilliant reflex-reflection almost without regard to the angle at which incident light strikes them (as observed, for example, by camera 10) are described and claimed in the application of Robert C. Vanstrum, Serial Number 791,164, filed February 4, 1959, now abandoned.

The reflex-reflecting structure to which this invention is primarily directed is provided with a lenticular surface, and is particularly useful for the wall portions 13 of the background screen 11.

Figure 2:
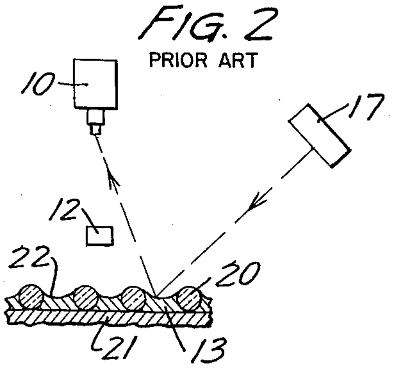
FIG. 2 PRIOR ART
FIGURE 2 is a schematic side view illustrating the glare characteristics associated with many prior art reflex-reflecting sheet articles which superficially bear a resemblance to the article hereof.

In the case of heretofore-known lenticular reflex-reflecting structures having spheroidal reflex-reflecting complexes 20 bonded together in a monolayer on a backing 21, as illustrated in FIGURE 2, some capillary action of the binder material 22 up the sides of the spheroidal complexes 20 ordinarily takes place. In FIGURE 2, the spheroidal complexes 20 are shown spaced from each other so as to permit illustration of this principle. While this capillary formation, plus the fact that the usual binder 22 normally exhibits a small amount of surface specular reflection, is insignificant in the oridnary sign applications for reflex-reflecting structures, it has been noted to cause a very slight degree of glare in the telecasting applications here discussed. In less sensitive environments, this slight glare would not be noticeable, or even distinguishable; but in the applications here discussed, it hampers the success and efficiency of telecasting. As graphically illustrated, the glare seems to arise by the fact that some light from lamp 17 directed upon the actor 12 or other object before the screen 13 strikes capillated portions between the reflex-reflective complexes 20 and is reflected toward the camera 10. The essentially uniform repetitive pattern characteristic of the surface of the sheeting is sufficient to cause a very slight but significant glare pattern to be picked up by camera 10 and separated by cell Y into the circuit employed for telecasting the image of character 12 or other object before screen 13.

The novel sheeting of this invention, however, obviates this problem and effectively diffuses and absorbs the light from lamps 17 and 18 so that such light does not serve to blur or reduce the vividness of the picture telecast from camera 20. This is accomplished by a surprisingly convenient and yet fully effective technique by which the capillating tendency of the bond for the reflex-reflecting complexes is materially reduced or eliminated and a minutely irregular surface is imparted to the bond material between the complexes.

Figure 3:
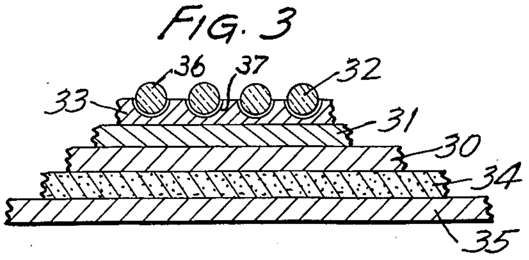
FIGURE 3 is a broken schematic cross-sectional view of the reflex-reflective sheet article of this invention.

Referring to FIGURE 3, our sheet article comprises a backing 30, a base film 31, and a layer or reflex-reflecting complexes 32 held in a flat-surfaced binder layer 33. While the complexes 32 in FIGURE 3 are illustrated as being spaced from each other, such is done solely for purposes of clarity of illustration; and it will be appreciated that they are in essential tangential contact with each other in a monolayer in actual structures formed as taught herein. On the side of the backing 30 opposite the reflex-reflecting surface is applied a coating 34 of water-insoluble normally tacky pressure-sensitive adhesive, with a disposable low-adhesion temporary removable liner 35.

The reflex-reflecting complexes consist essentially of small (e.g., up to about 10 mils diameter) glass beads 36 (or space coated beads) of approximately 1.9 refractive index (or an effective index of approximately 1.9), and an underlying specular reflecting means 37 in optical connection therewith. As illustrated in FIGURE 3, the underlying specular-reflecting means preferably takes the form of an essentially hemispherical light-reflecting coating in optical connection with the back extremity of each glass bead or sphere lens. Preferably the glass beads of these complexes are no large than approximately 150 microns in diameter, beads as small as 15 microns or so being useful. For indigo blue reflex-reflection as preferred, beads of a composition transmissive to wave lengths in the range of about 4000 to 5200 angstrom units, and relatively absorptive of other wave lengths, should be used as illustrated in the specific example to follow.

It is vital that the binder 33 contain a flatting agent such as, for example, finely divided silica aerogel (low density silica). Surprisingly, we have found that paint flatting agents serve to minimize or even eliminate the capillary tendencies of the usual resins employed in bonding complexes 32 in position. As illustrated in FIGURE 3, the bond material between reflex-reflecting complexes 32 presents essentially a flat surface on the exposed side of the structure. In addition to a flatting agent, the binder layer 33—which preferably is composed of a heat-curable film-forming organic resin mixture—contains a pigment which renders the layer absorptive of essentially the same wave lengths of visible light as the glass beads of the reflex-reflecting complexes. While the surface of the bond appears to be flat, it is in fact full of minute irregularities which contribute to diffusion of light not absorbed therein.

In preparing a specific sheeting having the properties described in connection with FIGURE 3, we have used the following procedure. First a backing was formed by coating a solution of polyvinyl butyral resin in ethyl Cellosolve upon a low-adhesion polystyrene coated paper, and the solvent evaporated. The coating was then fused by heating it to approximately 300° F. for 10 minutes. Then a base film was applied over the substrate, the following being the formulation for the base film:

| | Parts by weight |
|---|---|
| Oil modified alkyd varnish solution (60% solids in mineral spirits) | 81 |
| Melamine formaldehyde resin (55% solids in a mixture of xylol and butanol) | 8.9 |
| Phthalocyanine blue pigment | 4 |
| Finely divided silica aerogel | 5 |
| Metal napthanate dryer solution (60% solids in mineral spirits) | 1.1 |

A preferred type of oil modified alkyd resin is available under the trademark "Glyptal ZA104" from General Electric Company and is a solution of medium oil length, soya-modified phthalic alkyd resin (drying type).

The finely divided silica aerogel and phthalocyanine blue may be dispersed in the solution by ball milling.

The solution was coated on the backing at a thickness to leave a dried film of approximately 1 mil, after which the coating was heated to 225° F. for 15 minutes to cure the same. Then, over this base film was applied a further coating of the foregoing solution; and for this second coating, sufficient solution was applied to give a dried thickness of appriximately 0.5 mil. Evaporation of solvent from this second coating (i.e., the bond for the complexes) left a residual aggressively tacky surface layer. Over this tacky surface was flooded a free-flowing mass of silvered indigo blue beads, and the beads pressed into the tacky coating up to about 40% of their diameter.

The silvered beads had a core of indigo blue glass formed from cobalt blue colored glass having a compositional analysis, in mol percent, as follows: 3.55% $B_2O_3$, 38.41% $TiO_2$, 22.92% $SiO_2$, 12.63% $Na_2O$, 1.47% $K_2O$, 18.42% BaO, and 2.60% CoO. These glass cores (i.e., glass beads) had a refractive index of about 1.9 and were approximately 60 to 90 microns in diameter. They were relatively absorptive of visible light waves outside of the range of approximately 4,000 to 5,200 angstrom units, having a peak of light transmission around 4,600 angstrom units.

They were silvered as follow: approximately 300 parts by weight of beads were added to about 1,200 parts of water containing about 12 parts of silver nitrate in a stainless steel mixing vessel. To this was added 20 parts of a 28% solution of ammonium hydroxide while stirring the mixture. Then the mix was allowed to stand for about one minute. About 10 parts of dextrose in 32 parts of water were next added to the mixture, followed immediately by the addition of a solution of about 6 parts potassium hydroxide in 32 parts of water. Reaction was allowed to proceed for up to about 5 minutes so as to obtain a chemical deposition of silver on the bead surfaces. During this reaction the beads were stirred or agitated. After reaction, the water and components dissolved therein were removed from the coated beads and the coated beads washed with tap water and rinsed in acetone and dried at about 300° F. with mild agitation for about 5 minutes. (If desired, suitable reflectors may be formed using vapor deposition techniques.)

Excess beads on the surface of the structure were then removed by briefly holding the sheet in a vertical position, and the bead bond cured by heating to 220° F. for about 15 minutes. Silver from the exposed approximately hemispherical portion of the beads was then removed by dipping the surface of the structure for about 30 seconds into an etching solution consisting of about 25 parts of potassium dichromate, 92 parts of concentrated sulphuric acid, and about 3,000 parts of water. The structure was then thoroughly flushed with water, passed between two soft rubber rollers to remove a major proportion of the water, and then subjected to warm air to effect substantially complete drying of the same.

The laminate built up on the polystyrene surface was then removed and laminated to a pressure-sensitive adhesive coating consisting essentially of polymerized methyl isoamyl acrylate (acrylic ester of 2-methyl pentanol, 4) on a low adhesion polyethylene coated paper liner.

This sheet material exhibits essentially uniform reflex-reflection intensity at all angles within approximately 30 degress from normal. At least 40% of the bead surfaces are exposed to the atmosphere. Areas of the bead bond between contiguous beads in the layer have an essentially flat surface, with little or no capillary formation. Used to form the wall 13 of a background screen 11 in the art of telecasting as aforedescribed, this sheet material obviated the problems of glare associated with the capillated portions of prior art sheet structures. Light returned to the camera 10 from wall 13 was essentially solely that of the narrow band of wave lengths picked up by cell *b* and employed in causing appropriate printing or telecasting of the signals from camera 20. Areas of the picture telecast from camera 20 are thus vivid and show fine detail, without blurred or dim spots as occurs when a structure such as illustrated in FIGURE 2 is employed for the wall screen 13.

While primarily adapted for use in the specialized field of telecasting described herein, it is also appreciated that other reflex-reflective uses for the sheeting of this invention are possible. Thus it may find utility in roadside advertising, in the art of making movies, kinescopes, etc., where the telecasting principles aforediscussed are utilized, etc.

We claim:

1. A reflex-reflecting sheet material essentially free of glare reflection of light from sources at wide angles from an observer and exhibiting brilliant reflex-reflection of light throughout angles around normal as well as up to approximately 30 degrees from normal, said sheet comprising a backing and a plurality of minute reflex-reflecting complexes firmly bonded in essentially a uniform monolayer on said backing by a non-capillated bond containing a paint-type flatting agent, said complexes comprising sphere lenses of a refractive index of approximately 1.9 with reflective means optically associated with the underlying extremities thereof, the bond between said complexes in said layer being essentially flat and free of glare reflection characteristics.

2. A reflex-reflecting sheet material essentially free of glare reflection of light from sources at wide angles from an observer and exhibiting brilliant reflex-reflection of light within a limited band of wave lengths, said sheet material comprising a backing and, firmly bonded to said backing by a non-capillated bond containing a paint-type flatting agent, a layer of glass beads of a refractive index of approximately 1.9 with reflective means optically associated with the underlying extremities thereof, said beads being substantially absorptive of wave lengths of visible light except for a limited band thereof, the bond between beads in said layer being essentially flat, free of glare reflection characteristics, and substantially absorptive of essentially the same wave lengths of visible light as said glass beads.

3. In a combination comprising a main camera focused upon action before a screen, the improvement wherein said screen has at least a major proportion of the wall sections thereof covered with a reflex-reflecting sheet material essentially free of glare reflection of light from sources at wide angles from said main camera, and exhibiting brilliant reflex-reflection of light throughout angles around normal as well as up to approximately 30 degrees from normal, said sheet material comprising a multiplicity of reflex-reflecting complexes firmly bonded to a backing by a non-capillated bond containing a paint-type flatting agent, the complexes comprising sphere lenses of a refractive index of approximately 1.9 with reflective means optically associated with the underlying extremities thereof, the bond between said complexes being essentially flat, and free of glare reflection characteristics.

References Cited in the file of this patent

UNITED STATES PATENTS

| | | |
|---|---|---|
| 1,902,440 | Gill | Mar. 21, 1933 |
| 2,268,537 | Shuger | Dec. 30, 1941 |
| 2,555,715 | Tatum | June 5, 1951 |
| 2,575,270 | Harcourt | Nov. 13, 1951 |
| 2,611,819 | Serrell | Sept. 23, 1952 |
| 2,727,427 | Jenkins | Dec. 20, 1955 |